Dec. 21, 1971    A. D. ARGOUDELIS ET AL    3,629,406
SPARSOGENIN AND SPARSOGENIN A AND METHODS OF PREPARATION
Filed Oct. 26, 1961    4 Sheets-Sheet 1

FIGURE I
SPARSOGENIN

CLARENCE DE BOER
THOMAS E. EBLE
ROSS R. HERR
ALEXANDER D. ARGOUDELIS
INVENTORS

BY
ATTORNEYS

INFRARED ABSORPTION SPECTRUM OF SPARSOGENIN

CLARENCE DE BOER
THOMAS E. EBLE
ROSS R. HERR
ALEXANDER D. ARGOUDELIS
INVENTORS
ATTORNEYS

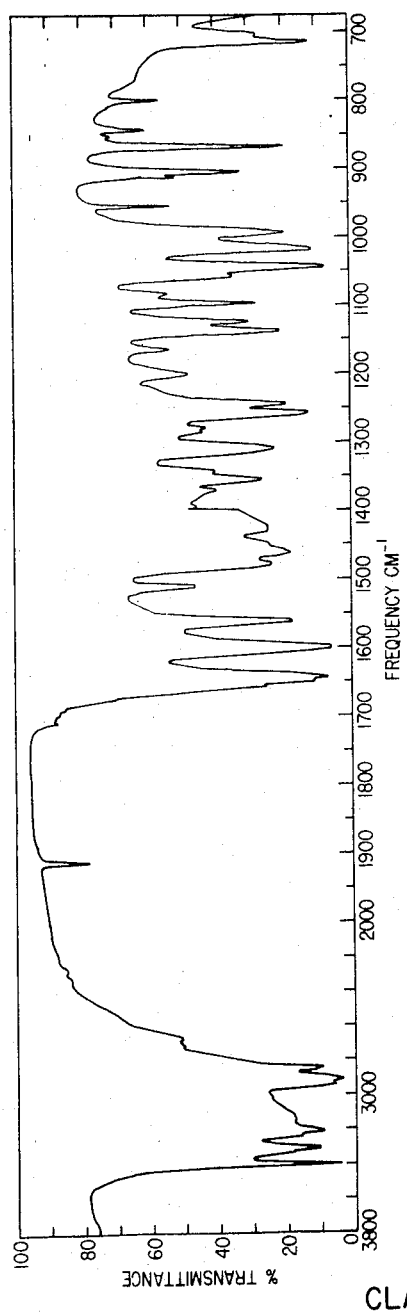

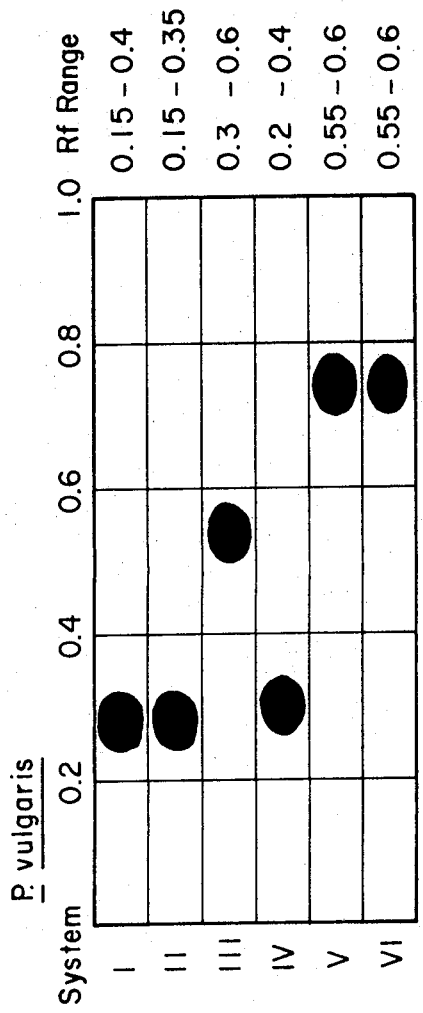
FIGURE 4 SPARSOGENIN A

United States Patent Office 3,629,406
Patented Dec. 21, 1971

3,629,406
SPARSOGENIN AND SPARSOGENIN A AND
METHODS OF PREPARATION
Alexander D. Argoudelis, Kalamazoo, Clarence De Boer,
Kalamazoo Township, Kalamazoo County, and Thomas
E. Eble and Ross R. Herr, Kalamazoo, Mich., assignors
to The Upjohn Company, Kalamazoo, Mich.
Filed Oct. 26, 1961, Ser. No. 147,873
Int. Cl. A61k 21/00
U.S. Cl. 424—118
14 Claims

ABSTRACT OF THE DISCLOSURE

This invention deals with antibiotics and methods of recovering and purifying them. The substances are sparsogenin having a calculated empirical formula $$C_{13}H_{21}N_3O_6S_2$$

Figure 1:
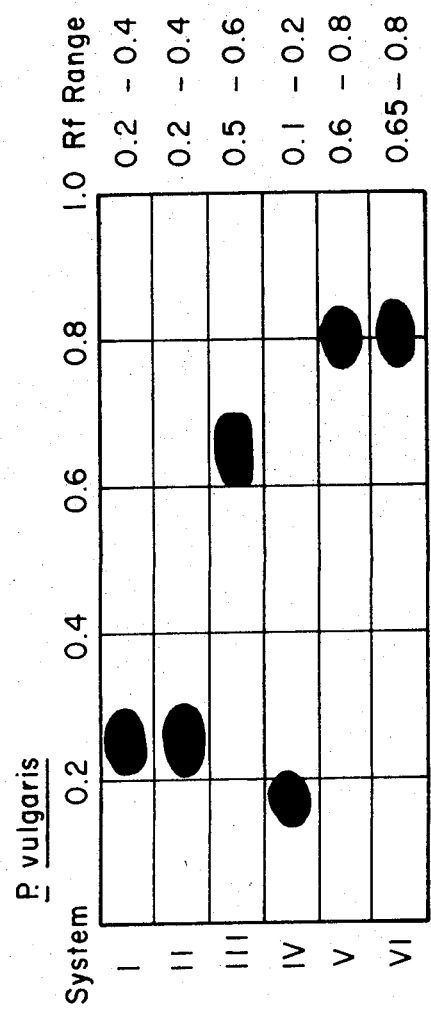

and sparsogenin A having a calculated formula $$C_{11}H_{14}O_4N_4$$

---

The invention described herein was made in the course of, or under, a contract with the Department of Health, Education and Welfare.

This invention relates to a novel composition of matter and to a process for the production thereof. More particularly this invention relates to a new compound, sparsogenin, to a process for the production thereof, and to a new compound, sparsogenin A, concomitantly produced.

Sparsogenin is a biosynthetic product obtained as an elaboration product of a sparsogenin-producing actinomycete. It is a weakly acidic compound which has a property of adversely affecting the growth of certain organisms, particularly bacteria, for example, *Bacillus subtilis, Proteus vulgaris, Lactobacillus casei, Salmonella gallinarum,* and *Klebsiella pneumoniae,* and tumor cells. Sparsogenin A is concomitantly produced. It has limited activity against bacteria but is active against tumor cells. Either or both sparsogenin and sparsogenin A can be used alone or in combination with other antibacterial or antitumor agents to prevent the growth of or reduce the number of such organisms or cells present in various environments. The safety and effectiveness of sparsogenin and sparsogenin A in human therapy, however, have not yet been established.

The actinomycete used according to this invention, for the production of sparsogenin, has been designated as *Streptomyces sparsogenes* var. *sparsogenes.* One of its strain characteristics is the production of sparsogenin. A subculture of this variety can be obtained from the permanent collection of the Northern Utilization and Research Division, Agricultural Research Service, U.S. Department of Agriculture, Peoria, Ill., U.S.A. Its accession No. in this repository is NRRL 2940.

*Streptomcyes sparsogenes* var. *sparsogenes* has poor to fair white to gray white aerial growth and colorless to yellow vegetative growth. It has many coremia with branches. Sporophores are clustered along the hyphae and terminate in tight spirals of few to many turns. Pigment production is negligible. There is a slight yellow pigment on a few media. Further macroscopic characteristics are cited in Tables 1 to 3.

TABLE 1
Appearance on Ektachrome*

| Agar medium | Surface | Reverse |
| --- | --- | --- |
| 1 Bennett's | Gray white | Yellow Tan. |
| 2 Czapek's sucrose | do | Do. |
| 3 Maltose tryptone | | Do. |
| 4 Peptone-iron | | Do. |
| 5 0.1% tyrosine | | Red. |
| 6 Casein starch | | Colorless. |

*Dietz, A., "Ektachrome Transparencies as Aids in Actinomycete Classification," Annals of the N.Y. Academy of Science, 60:152–154, 1954.

TABLE 2
Assimilation of Carbon Compounds in Synthetic Medium*

| | | | | | |
| --- | --- | --- | --- | --- | --- |
| D-xylose | (+) | Cellobiose | + | Salicin | − |
| L-arabinose | (+) | Raffinose | (+) | Na formate | − |
| Rhamnose | (+) | Dextrin | (+) | Na oxalate | − |
| D-fructose | + | Inulin | (+) | Na tartrate | − |
| D-galactose | (+) | Soluble starch | (+) | Na salicylate | − |
| D-glucose | (+) | Glycerol | + | Na acetate | − |
| D-mannose | + | Dulcitol | (+) | Na citrate | − |
| Maltose | (−) | D-mannitol | (+) | Na succinate | − |
| Sucrose | (+) | D-sorbitol | (−) | Control | − |
| Lactose | + | Inositol | (+) | | |

*Pridham, T. G. and Gottlieb, D., "Assimilation of Carbon Compounds in Synthetic Medium," J. Bact. 56:107–114, 1948.
NOTE: +=Good growth, positive assimilation; (+)=Slight growth, positive assimilation; (−)=Slight growth, no assimilation; −−=No growth.

TABLE 3
Cultural Characteristics

| Medium | Aerial | Vegetative | Other |
| --- | --- | --- | --- |
| Plain gelatin | None | Colorless | Partial liquefaction. |
| Nutrient gelatin | do | do | Do. |
| Nutrient nitrate broth | do | Colorless, dropping to base | No reduction. |
| Synthetic nitrate broth | do | Colorless, dropping to base; slight growth throughout. | Reduction. |
| Litmus milk | do | Colorless ring at surface; flocculent at base. | Partial peptonization; pH 6.2. |
| Peptone-iron agar | do | Yellow | No H₂S darkening. |
| Calcium malate agar | Fair pale gray-white | Pale gray-white | Malate not solubilized. |
| Skim milk agar | None | Yellow | Yellow pigment. |
| Glucose asparagine agar | do | Pale yellow | None. |
| Casein starch agar | | No growth | |
| Nutrient starch agar | None | Colorless | Do. |
| Tyrosine agar | do | Tan | Tan pigment; tyrosine solubilized. |
| Xanthine agar | do | Pale yellow | Pale yellow pigment; xanthine not solubilized. |
| Maltose tryptone agar | do | Colorless | None. |
| Bennett's agar | Gray-white | Yellow | Trace yellow pigment; trace colorless vegetative at 18°; fair colorless vegetative at 24 and 37°; no growth at 55°. |
| Czapek's sucrose agar | White | Pink | Trace colorless vegetative at 18°; fair colorless vegetative at 24 and 37°; no growth at 55°. |

The new compound of the invention is produced when the elaborating organism is grown in an aqueous nutrient medium under submerged aerobic conditions, and preferably in a nutrient medium containing a carbon source, for example, an assimilable carbohydrate, and a nitrogen source, for example, an assimilable nitrogen compound or proteinaceous material. It is to be understood also that for the preparation of limited amounts surface cultures in bottles can be employed. Preferred carbon sources include glucose, brown sugar, sucrose, glycerol, starch, corn starch, lactose, dextrin, molasses, and like carbohydrate sources. Preferred nitrogen sources include corn steep liquor, yeast, autolyzed Brewer's yeast with milk solids, soybean meal, cottonseed meal, corn meal, milk solids, pancreatic digest of casein, distiller's solubles, animal peptone liquors, meat and bone scraps, and like nitrogenous sources. Combination of these carbon and nitrogen sources can be used advantageously. Trace metals, for example, zinc, magnesium, manganese, cobalt, iron and the like, need not be added to the fermentation media since tap water and unpurified ingredients are used as media components.

Production of the compound of the invention can be effected at any temperature conducive to satisfactory growth of the microorganism, for example, between about 18° and 40° C. and preferably between about 26° and 30° C. Ordinarily, optimum production of the compound is obtained in from about 2 to 10 days. The medium normally stays fairly close to neutral, or on the alkaline side, during the fermentation. The final pH is dependent, in part, on the initial pH of the culture medium which is advantageously adjusted to about pH 6–8 prior to sterilization and the buffers present, if any.

When the growth is carried out in large vessels and tanks, it is preferable to use the vegetative form of the microorganism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active vegetative inoculum has thus been secured, it is transferred aseptically to large vessels or tanks. The medium in which the vegetative inoculum is produced can be the same as, or different from, that utilized for the production of the new compound as long as it is such that a good growth of the microorganism is obtained.

In accordance with a preferred recovery process the whole beer or fermentation broth is adjusted to an acid pH with sulfuric acid or other strong acid, advantageously to pH 2.5, and filtered. A filter aid, for example, diatomite, can be used. The clarified beer is then neutralized with sodium hydroxide or other base to an alkaline pH, advantageously to about pH 8, and brought into contact with a capillary or surface active adsorbent, for example, decolorizing carbon or decolorizing resins. A suitable decolorizing resin is Permutit DR (U.S. Pat. 2,702,263). The new compound is then eluted from the adsorbent with an acid solution, for example 50% aqueous acetone adjusted to pH 2.5 with sulfuric acid. Other acidified solvent solutions may be used to elute the adsorbent, for example, water miscible lower alkanols such as methyl alcohol and ethyl alcohol and the like. The eluate is then concentrated to remove the solvent and the resulting aqueous solution freeze dried. Advantageously, the concentration and freeze drying is effected at a pH of from about 5 to 7.

The crude material thus obtained contains sparsogenin and sparsogenin A and a non-polar component. Sparsogenin is an acidic compound having an empirical formula which agrees well with $C_{13}H_{21}N_3O_6S_2$ but does not exclude $C_{13}H_{19}N_3O_6S_2$. It has a single acidic group with a pK'a of 8.6–9.0 in water and it has characteristic ultraviolet and infrared absorption. Sparsogenin A is a basic crystalline compound having an empirical formula $C_{11}H_{14}N_4O_4$ and $pKa^1$ value of 5–5.2 in water. It has characteristic ultraviolet and infrared absorption.

Sparsogenin and sparsogenin A can be separated by two solvent fractional liquid extractions, for example, in a partition chromatographic column or in a countercurrent distribution apparatus. Suitable for this purpose are the following solvent systems.

Solvent systems employed

Partition column:
  Equal volumes (350 1.) of McIlvaine's pH 6.0 buffer and MFK (methyl ethyl ketone).
Craig countercurrent distribution:
  1-butanol, ethyl acetate and water (1.2:0.5:1.9).
  1-butanol, acetic and water (25:1:25)
  2-butanol: water.

The separate components can be further purified by repeated two solvent fractional liquid extraction or by crystallization or recrystallization. Sparsogenin can be dissolved in hot water and then separated out as crystals on subsequent chilling of the solution. Sparsogenin A can be dissolved in aqueous hydrochloric acid and then separated out as crystals on subsequent neutralization of the solution to a pH of about 8–9.

Sparsogenin A forms salts and can be purified and sometimes separated from sparsogenin by successive transfers from protonated to nonprotonated forms, especially with intervening other types of treatments, as for example, recrystallization and/or fractional liquid-liquid extraction. It can be purified, for example, by conversion to less double salt forms, for example, by reaction with helianthic acid, Reinecke's acid, azobenzene sulfonic acid, picric acid, and the like. The salts thus obtained can be used for the same purposes as the free base. They can be converted back to the free base and then converted to other salts such as the hydrochloride, phosphate, and sulfate.

The salts can be converted to the free base by neutralizing with an alkali or by contacting with an anionic resin, advantageously to about pH 8 to 11. Specific acid salts can be obtained by neutralizing the free base with the appropriate acid to below about pH 5, advantageously to about pH 1 to 4. Suitable acids for this purpose include hydrochloric, sulfuric, phosphoric, acetic, succinic, lactic, maleic, and fumaric, and methanesulfonic, benzene-sulfonic, helianthic, Reinecke's, azobenzene sulfonic, picric, and like acids.

Sparsogenin and the non-polar component can be separated by subjecting the material containing both components to a leaching process with methanol. Specifically, the material containing both sparsogenin and the non-polar component is dissolved in absolute methanol, the solution is clarified by filtration and then anhydrous diethyl ether is added with stirring. The resulting precipitate is filtered and washed with ether to give a white powder which can be shown by paper chromatographic analysis to be free of the non-polar component.

The new compound of the invention, sparsogenin, has a broad spectrum of antibacterial activities, moderate activity against several fungi and also inhibits the growth of KB human epidermoid carcinoma cells in tissue culture.

Antibacterial spectrum.—A two-fold dilution spectrum using the broth media indicated in the following Table I was run with sparsogenin. Assay tubes (18 x 150 mm.) were prepared in the customary manner as set out in Snell, E. E., Vitamin Methods, vol. I, Academic Press, Inc., New York, 1950, p. 327. The test organisms, grown for 18 hours at 37° C., were used to inoculate the test medium at a dilution of 1–40,000.

TABLE I.—ANTIBACTERIAL SPECTRUM OF SPARSOGENIN

| Test organism | Growth medium [1] | Incubation temperature | M.I.C.[2] (mcg./ml.) | | |
|---|---|---|---|---|---|
| | | | 16 hrs. | 24 hrs. | 40 hrs |
| Bacillus subtilis | BHI | [3] 32° C. | >10 | >10 | >10 |
| Lactobacillus casei | BHI | 37 | 10 | 12.5 | 12.5 |
| Streptococcus jecalis | BHI | 37 | 25 | 25–50 | 50 |
| Klebsiella pneumoniae | BHI | 32 | 25 | 25 | 25 |
| Proteus vulgaris | BHI | 32 | 10 | 12.5–25 | 25 |
| Escherichia coli | BHI | 32 | 25 | 25 | 25 |
| Salmonella gallinarum | BHI | 32 | 5–10 | 5–10 | 6.3–12.5 |

[1] BHI, Brain Heart Infusion Broth, Difco, Detroit, Michigan.
[2] M.I.C., Minimal Inhibitory Concentration.
[3] B. subtilis was incubated with agitation on a reciprocating shaker.

Antifungal activity.—Sparsogenin is effective against Nocardia asteroides, Blastomyces dermatitidis, Cryptococcus neoformans, Monosporum apiospermum, Hormodendrum compactum, Phialophora verrucosa, and Candida albicans Abbott at agar [1] plate dilutions of 10–100 mcg./ml.

---
[1] Fungal spectrum agar in grams per liter of distilled water: glucose, 10; Bacto-Peptone, 5; Difco Yeast Extract, 1; Bacto-Agar, 20. Adjust to pH 6.8 prior to sterilization.

Tissue culture activity.—The procedure of Smith et al. (Smith, C. G., Lummis, W. L., and Grady, J. E.: An improved tissue culture assay. I Methodology and cytotoxicity of antitumor agents, Cancer Research, 19: 843–846, 1959) was used to determine the cytotoxicity of sparsogenin to KB human epidermoid carcinoma cells in tissue culture. KB cell protein synthesis was inhibited 50% ($ID_{50}$) at a concentration of 0.05 mcg./ml.

The new compound of the invention, sparsogenin A, inhibits the growth of gram positive and gram negative bacteria, for example, Staphylococcus aureous and Proteus vulgaris, and also inhibits the growth of KB cells in tissue culture and Walker adenocarcinoma W–256 in mice.

The new compound of the invention, sparsogenin, is active against Bacillus subtilis and can be used for treating breeding places of silk worms to prevent or minimize infections caused by this organism. It can also be used to minimize or prevent odor in fish and fish crates caused by this organism.

The new compound of the invention, sparsogenin A is active against Proteus vulgaris and can be used to prevent or minimize liquefaction in packed yeast caused by this organism.

The new compounds of the invention, sparsogenin and sparsogenin A, can also be used for washing excise tumor tissue to utilize transplants in animals in order to inhibit the growth of any KB tumor cells that might otherwise seed surrounding tissues or be transported to other parts of the animal body.

The following examples are illustrative of the process and products of the invention but are not to be construed as limiting. All percentages are by weight and all solvent mixture proportions are by volume unless otherwise noted.

EXAMPLE 1

(A) Fermentation

A soil slant of Streptomyces sparsogenes var. sparsogenes, NRRL 2940, was used to inoculate a series of 500-ml. Erlenmeyer flasks each containing 100 ml. of seed medium consisting of the following ingredients:

Glucose monohydrate—25 grams
Pharmamedia [2]—25 grams
Tap water q.s., 1 liter.

[2] Pharmamedia is an industrial grade of cottonseed flour produced by Traders Oil Mill Co., Fort Worth, Tex.

The seed medium presterilization pH was 7.2. The seed was grown for two days at 28° C. on a Gump rotary shaker operating at 250 r.p.m.

One shake flask of the seed described above (100 ml.) was used to inoculate a 20 liter seed tank containing 15 liters of the above sterile seed medium (S–1) plus 1 ml./l. of lard oil. The seed tank was grown for 24 hours at a temperature of 28° C., aeration rate of 10 standard liters/min., and agitated at a rate of 400 r.p.m.

The seed tank, described above, was then used to inoculate a 380-liter fermentor containing 250 liters of the following sterile medium:

Glucose monohydrate—10 g./liter
Dextrin—15 g./liter
Pharmamedia—20 g./liter
Wilson's peptone liquor No. 159 [3]—5 g./liter
Lard oil—2 ml./liter
Tap water, balance.

[3] Wilson's Peptone Liquor No. 159 is a preparation of hydrolyzed proteins from animal origin.

The fermentation then proceeded for 113 hours during which time the temperature was controlled at 28° C., filtered air supplied at a rate of 100 standard liters/minute, and agitation at 28 r.p.m. During the course of the fermentation, 1850 ml./l. of lard oil was added as an antifoam.

(B) Recovery

The whole beer from the above fermentation was adjusted from the harvested pH of 7.1 to pH 2.4 with 350 ml. of sulfuric acid (concentrated) and filtered using 3.6% diatomaceous earth as filter aid. The filter cake was washed with 0.2 volume of deionized water, the clear beer plus wash (vol. 280 liters) was adjusted to pH 7.35 with 300 ml. of 50% aqueous sodium hydroxide and allowed to stand overnight at 10° C. The clear beer was then adjusted to pH 8 with 50 ml. of 50% aqueous sodium hydroxide and stirred one hour with 1% decolorizing carbon and 3% diatomite. The mixture was filtered and the carbon cake washed with 0.2 volume of 20% aqueous acetone. The washed carbon cake was eluted twice with 0.4 volume of 50% aqueous acetone, acidified to pH 2.5 with concentrated sulfuric acid, and the eluates pooled. The pooled acetone eluate (72 liters) was adjusted to pH 6.4 with 30 ml. of 50% aqueous sodium hydroxide and concentrated to an aqueous solution (40 liters). The concentrate was adjusted to pH 5.9 and freeze dried to give 447 g. of lyophilized material.

An additional 1126 g. was obtained by twice repeating the above fermentation and recovery. The combined lyophilized material (1573 g.) was slurried in 10 liters of methanol at 40° C. for one hour. Insoluble material was filtered off and washed three times with 500 ml. of warm methanol (40° C.). The methanol extracts and washes were combined (11.5 liters) and concentrated in vacuo to a dry preparation weighing 321 g. (HRV–25.3) and assaying 1.25 Proteus vulgaris biounits/mg.

(C) Purification (1) Partition column.—Three hundred grams of the above preparation (HRV–25.3) was placed in a partition column which was prepared and developed in the following manner. A solvent system was made using equal volumes (350 liters) of McIlvaine's pH 6.0 buffer and methyl ethyl ketone. A slurry containing 9.6 kg. of diatomite in 60 liters of upper phase and 4.8 liters of lower phase of the above described solvent system was poured into a 12″ column and packed with 4 p.s.i.g. of nitrogen. The column feed was dissolved in 3 liters of lower phase, slurried with 1920 g. of diatomite and enough upper phase added to make it mobile. The feed was carefully added to the top of the column bed which was covered with a layer of sea sand. The column was eluted with upper phase solvent at a rate of 2 l./minute. Four-liter fractions were collected except at the beginning and end of the column when 20-liter fractions were collected. The fractions were concentrated and bio-activities observed on P. vulgaris trays. At this point in the process the separation of sparsogenin and sparsogenin A was effectuated. Further processing purified these components and ultimately resulted in crystalline material.

(2) Purification of sparsogenin.—Fractions 24–34, inclusive, from the above partition column contained the sparsogenin component. These fractions (19.07 g.) were pooled and leached with 480 ml. of absolute methanol. To this methanolic solution was added 2500 ml. of ethyl ether. The precipitated material was then washed with 500 ml. of ether and dried to yield 7 g. of preparation ADA–99.1. This step, methanol leaching, removed any residual non-polar material. Of this precipitate preparation, 6.2 g. was used with a solvent system of 1-butanol, ethyl acetate and water (1.2:0.5:1.9) to complete a 300-transfer Craig countercurrent distribution (CCD). Two peaks with K values of 0.15 and 0.55 were observed. The fraction having a K of 0.55 gave by concentration to dryness preparation ADA–113.4. A portion of this preparation was then subjected to two more CCD's in two different solvent systems (1-butanol, acetic acid, and water-2000:80:2000; 1-butanol, ethyl acetate, and water-1.2:0.5:1.9) to establish the purity. A single peak was found in each case and identified as sparsogenin. ADA–113.4 was then used to prepare a crystalline material in the following manner. Part of this fraction (430 mg.) was dissolved in 4 ml. of 0.1 N HCl by heating on a steambath. The clear solution was chilled in the refrigerator for 4 hours and then the crystalline material was filtered off and recrystallized from 0.1 N HCl. The crystals obtained were washed with ethanol and dried. The crystals were then distributed for 200 transfers in the Craig using a solvent system consisting of 2-butanol:water. A single solids peak was obtained that fit the theoretical curve (K=0.739). The peak fractions were combined, concentrated to remove 2-butanol and lyophilized to give 100 mg. of crystalline preparation (ADA-72.1) having an equivalent weight of 358, pKa' of 8.64 in water, a characteristic papergram pattern as shown in FIG. 1 of the accompanying drawing, an ultraviolet absorption spectrum in Water: 270 m$\mu$, a=39.31; 301.5 m$\mu$, a=60.39.
0.01 N aq. $H_2SO_4$: 270 m$\mu$, a=39.95; 301.5 m$\mu$, a=60.28.
0.01 N aq. KOH: 236 m$\mu$ (sh) a=17.61; 284 m$\mu$ (sh) a=29.31; 328 m$\mu$, a=69.38.

and the following elemental analysis:

Calculated for $C_{13}H_{21}N_3O_6S_2$ (percent): C, 41.20; H, 5.61; N, 11.09; S, 16.92; O, 25.33. Found (percent): C, 40.91; H, 5.65; N, 11.38; S. 16.95.

Figure 2:
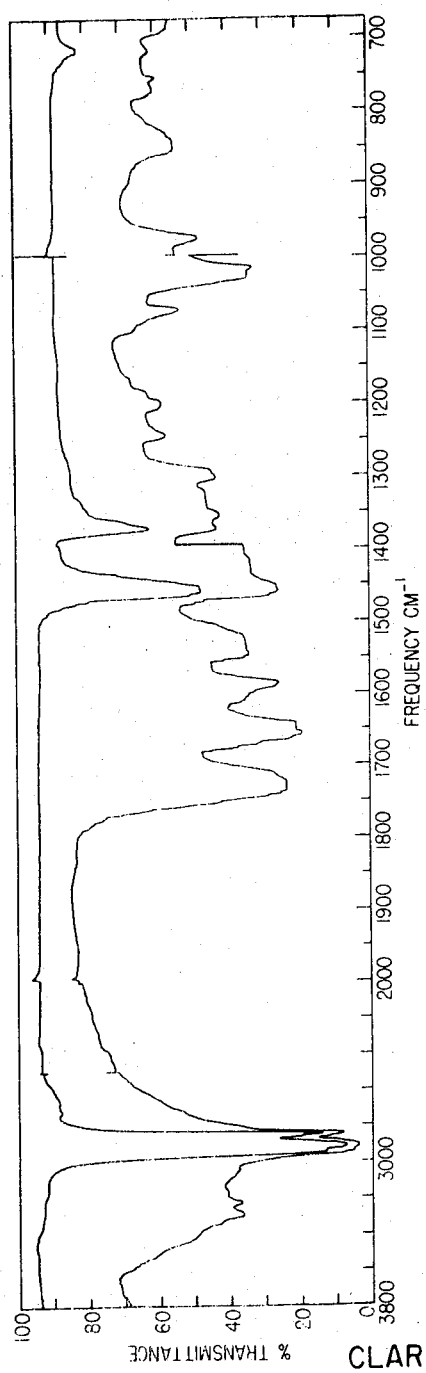

The extraction and purification of sparsogenin, as described above, was scaled up to yield 800 mg. of crystalline preparation ADA–76.3 having an optical rotation $[a]_D^{25}$ +69° (C.=0.756 in water), equivalent weight of 356, pKa' of 8.98 in water, an ultra-violet absorption spectrum in Water: 270 m$\mu$ (sh) a=42.30; 301.5 m$\mu$, a=66.64.
0.01 N aq. $H_2SO_4$: 270 m$\mu$ (sh) a=43.42; 301.5 m$\mu$, a=67.09.
0.01 N aq. KOH: 236 m$\mu$ (sh) a=17.20; 284 m$\mu$ (sh) a=30.15; 328 m$\mu$, a=74.73.

a characteristic IR absorption at the following frequencies expressed in reciprocal centimeters:

| | | | |
|---|---|---|---|
| 3,295 (S) | 1,585 (S) | 1,303 (M) | 1,015 (S) |
| 3,230 (S) | 1,547 (S) | 1,293 (M) | 973 (M) |
| 2,915 (S) (oil) | 1,525 (S) | 1,245 (W) | 845 (M) |
| 2,842 (S) (oil) | 1,460 (S) (oil) | 1,200 (W) | 773 (W) |
| 1,732 (S) | 1,375 (S) (oil) | 1,186 (W) | 755 (W) |
| 1,660 (S) | 1,353 (M) | 1,073 (M) | 717 (W) (oil) |
| 1,645 (S) | 1,325 (M) | 1,027 (S) | | and as shown in Fig. 2 of the accompanying drawing. Titration data of the single pká indicates that the equivalent weight is also the molecular weight.

(3) Purification of sparsogenin A.—The sparsogenin A component was purified and crystallized in the following manner. Fraction 11–20, inclusive, from the previously described partition column—part C (1)—contained the sparsogen in A component. These fractions were pooled and concentrated under reduced pressure and 7.2 grams of crystalline material was isolated. These crystals were dissolved in 400 ml. of water and 50 ml. of 0.1 N HCl. The solution was heated gently to facilitate dissolving and then filtered. The clear solution was adjusted to pH 9.0 with 50% aqueous sodium hydroxide and chilled in the refrigerator for 5 hours. The crystals were collected by filtration, washed with water, and dried to give 5.65 grams of preparation ADA-102.1. Two grams of this preparation were then dissolved in 75 ml. of water and 20 ml. of 0.1 N HCl. This clear solution was adjusted to pH 9.0 with 50% aqueous sodium hydroxide. Crystallization started immediately. The solution was left at 25° C. for 7 hours and then the crystals were collected, washed with 25 ml. of water, and dried to yield 1.52 grams of preparation ADA–105.1 having a melting point of 247.8–250° C., an optical rotation $[\alpha]_D^{25}$ −62° )c.= 0.718 in 0.1 N HCl), an equivalent weight of 269, pKa' of 5.07 in water, an ultra-violet absorption spectrum in Water: 270 m$\mu$, a=44.14.
0.01 N $H_2SO_4$: 227 m$\mu$, a=85.28; 271 m$\mu$, a=40.82.
0.01 N KOH: 270 –m$\mu$, a=43.50.

a characteristic IR absorption at the following frequencies expressed in reciprocal centimeters

| | | | |
|---|---|---|---|
| 3,350 (S) | 1,475 (M) | 1,160 (W) | 903 (M) |
| 3,250 (S) | 1,458 (S) (oil) | 1,134 (M) | 867 (M) |
| 3,145 (S) | 1,445 (M) (sh) | 1,120 (M) | 852 (W) |
| 3,095 (S) (sh) | 1,426 (M) | 1,093 (M) | 842 (W) |
| 2,880 (S) (oil) | 1,370 (M) (oil) | 1,080 (W) | 799 (W) |
| 2,810 (S) (oil) | 1,351 (M) | 1,055 (M) | 715 (M) |
| 1,895 (W) | 1,306 (M) | 1,042 (S) | 704 (W) |
| 1,640 (S) | 1,276 (W) | 1,017 (S) | 675 (M) |
| 1,592 (S) | 1,255 (S) | 992 (S) | 658 (M) |
| 1,553 (M) | 1,241 (M) | 953 (W) | |
| 1,502 (M) | 1,198 (W) | 912 (W) | | and the following elemental analysis:

Calculated for $C_{11}H_{14}N_4O_4$ (percent): C, 49.62; H, 5.30; N. 21.04. Found (percent): C, 49.81; H, 5.20; N, 20.92.

Sparsogenin A was also isolated and purified from fermentation broth in another manner. The fermentation was carried on as described above under A. The whole beer (AJW–63) was adjusted to pH 2.5 with 365 ml. of concentrated sulfuric acid and filtered using 6% diatomaceous earth as filter aid. The filter cake was washed with 0.1 volume of deionized water and the wash added to the clear beer. The clear beer was then adjusted to pH 8.0 with 400 ml. of 50% aqueous sodium hydroxide and stirred one hour with 1% decolorizing carbon and 3% diatomite. The mixture was filter and the carbon cake washed with 0.1 volume of deionized water followed by 0.2 volume of 20% aqueous acetone. The washed carbon was eluted twice with 0.4 volume of 50% aqueous acetone which had been acidified to pH 2.5 with concentrated sulfuric acid. and the eluates pooled. The pooled acetone eluates were then adjusted to pH 4.8 with 53 ml. of 50% aqueous sodium hydroxide, concentrated to an aqueous solution and freeze-dried to yield 284 grams of preparation WMH–32.6 assaying 9KB $\mu$/mg. in tissue culture. One hundred grams of this preparation was then dissolved in 600 ml. of methanol and 4 volumes of ether added to precipitate the inactive material. From the methanol-ether supernatant two crops of crystalline material were isolated by allowing the solvent to evaporate slowly. These preparations were pooled and redissolved in 35 ml. of water and 5 ml. of 0.1 N hydrochloric acid. The solution was then filtered and adjusted to pH 9.4 with 50% aqueous sodium hydroxide. The sparsogenin A which separated in crystalline form was collected, washed with water, and dried to give 480 mg. of preparation ADA–104.1 having a melting point of 247.8–250.8° C., an optical rotation $[\alpha]_D^{25}$ −61° (c.=0.908 in 0.1 N HCl), an equivalent weight of 270, pká of 5.05 in water, an ultraviolet absorption spectrum in Water: 269.5 m$\mu$, a=44.27.
0.01 N $H_2SO_4$: 227 m$\mu$, a=86.06; 271 m$\mu$, a=41.35.
0.01 N KOH: 270 m$\mu$, a=43.61.

a characteristic IR absorption at the following frequencies expressed in reciprocal centimeters

| | | | |
|---|---|---|---|
| 3,400 (S) | 1,562 (S) | 1,200 (M) | 870 (S) |
| 3,310 (S) | 1,510 (M) | 1,164 (M) | 852 (W) |
| 3,240 (S) | 1,480 (S) | 1,137 (S) | 843 (W) |
| 3,220 (S) | 1,462 (S) (oil) | 1,125 (M) | 800 (M) |
| 3,140 (S) | 1,425 (S) | 1,092 (S) | 715 (S) |
| 2,950 (S) (oil) | 1,370 (M) (oil) | 1,084 (M) | 702 (S) |
| 2,920 (S) (oil) | 1,355 (S) | 1,057 (M) | |
| 2,850 (S) (oil) | 1,342 (M) | 1,045 (S) | |
| 2,620 (M) | 1,310 (S) | 1,020 (S) | |
| 1,910 (W) | 1,285 (M) | 995 (S) | |
| 1,650 (S) | 1,280 (M) | 955 (S) | |
| 1,645 (S) | 1,260 (S) | 912 (S) | |
| 1,600 (S) | 1,245 (S) | 905 (M) | | and as shown in FIG. 3 of the accompanying drawing, a characteristic papergram pattern as shown in FIG. 4, and the following elemental analysis:

Calculated for $C_{11}H_{14}N_4O_4$ (percent): C, 49.62; H, 5.30; N, 21.04. Found (percent): C, 49.62; H, 5.04; N, 20.81.

The characteristics of sparsogenin A, described above, are in good agreement with those reported in the literature for tubercidin. See Anzai, K.; G. Nakamura and S. Suzuki: A new antibiotic, tubercidin. J. Antibiotics, Ser. A, pp. 201–204, September 1957. However, no process whereby tubericidin can be produced is disclosed.

We claim:
1. The substance designated sparsogenin which:
   (a) is effective in inhibiting the growth of gram-positive and gram-negative bacteria;
   (b) is effective in inhibiting the growth of KB cells in tissue culture;
   (c) is an acidic substance which is slightly soluble in water and lower alcohols and insoluble in less polar organic solvents;
and which in its essentially pure crystalline form
   (d) has a pKa' of 8.6–9.0 in water and an equivalent weight of 356;
   (e) has a characteristic ultra-violet absorption maxima as follows
      water: 270 m$\mu$, (sh), a=42.30; 301.5 m$\mu$, a=66.64.
      0.01 N aq. $H_2SO_4$: 270 m$\mu$, (sh), a=43.42; 301.5 m$\mu$, a=67.09.
      0.01 N aq. KOH: 236 m$\mu$, (sh), a=17.20; 284 m$\mu$, (sh), a=30.15; 328 m$\mu$, a=74.73.
   (f) has an optical rotation $[\alpha]_D^{25}$ +69° (c.=1.756, in water);
   (g) has a calculated empirical formula $C_{13}H_{21}N_3O_6S_2$; and
   (h) exhibits a characteristic IR absorption as shown in FIG. 2 of the accompanying drawing.
2. A composition of matter consisting of sparsogenin as defined in claim 1.
3. A compound according to claim 2 in its essentially pure crystalline form.
4. The substance designated sparsogenin A which:
   (a) is effective in inhibiting the growth of gram-positive and gram-negative bacteria;
   (b) is effective in inhibiting the growth of Walker adenocarcinoma in mice;
   (c) is a basic substance which is slightly soluble in water and lower alcohols and insoluble in acetone, ethyl acetate, chloroform, benzene and petroleum ether;
and which in its essentially pure crystalline form
   (d) has a pKá of 5.07 in water and an equivalent weight of 269;
   (e) has an optical rotation $[\alpha]_D^{25}$ −62° (c.=0.718 in 0.1 N HCl);
   (f) has a characteristic ultra-violet maxima as follows:
      water: 270 m$\mu$, a=44.14.
      0.01 N $H_2SO_4$: 227 m$\mu$, a=85.28; 271 m$\mu$, a=40.82.
      0.01 N KOH: 270 m$\mu$, a=43.50.
   (g) has a calculated empirical formula $C_{11}H_{14}O_4N_4$; and
   (i) exhibits a characteristic IR absorption as shown in FIG. 3 of the accompanying drawing.
5. A composition of matter consisting of sparsogenin A free base as defined in claim 4.
6. An acid addition salt of sparsogenin A as defined in claim 4.
7. The compound according to claim 4 in its essentially pure crystalline form.
8. A compound selected from the group consisting of sparsogenin A according to claim 4 and the acid addition salts thereof.
9. A process which comprises cultivating *Streptomyces sparsogenes* var. *sparsogenes* in an aqueous nutrient medium under aerobic conditions until substantial activity is imparted to said medium by production of sparsogenin and sparsogenin A.
10. A process which comprises cultivating *Streptomyces sparsogenes* var. *sparsogenes* in an aqueous nutrient medium containing a source of assimilable carbohydrate and assimilable nitrogen under aerobic conditions until substantial activity is imparted to said medium by production of sparsogenin and sparsogenin A and isolating the sparsogenin and sparsogenin A so produced.
11. A process according to claim 10 which comprises contacting the medium with a capillary adsorbent and recovering sparsogenin and sparsogenin A from the adsorbent.
12. A process according to claim 11 in which the absorbent is eluted with an acidified water miscible solvent to recover the sparsogenin and sparsogenin A:
13. A process according to claim 12 in which the eluate is subjected to fractional liquid-liquid extraction to separate sparsogenin and sparsogenin A.
14. A process to recover sparsogenin A which comprises:
   (a) contacting an aqueous solution containing sparsogenin and sparsogenin A with a capillary adsorbent;
   (b) eluting the adsorbent with an acidified water miscible solvent;
   (c) evaporating the solvent from the eluate to form a concentrate;
   (d) dissolving the concentrate in methanol;
   (e) adding ether to the methanol solution;
and then
   (f) separating the methanol-ether supernatant and isolating crystalline sparsogenin A from the supernatant.

References Cited

Suzuki et al., J. of Antibiotics (vol. 14), 1961, pp. 34–38.

SAM ROSEN, Primary Examiner

U.S. Cl. X.R.
424—116; 195—80